United States Patent
Gerding et al.

(10) Patent No.: US 7,746,011 B2
(45) Date of Patent: Jun. 29, 2010

(54) VEHICLE SEAT, IN PARTICULAR A MOTOR-VEHICLE SEAT

(75) Inventors: Rainer Gerding, Hannover (DE); Thomas Bethge, Wennigsen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 214 days.

(21) Appl. No.: 11/639,207

(22) Filed: Dec. 15, 2006

(65) Prior Publication Data

US 2007/0096668 A1  May 3, 2007

Related U.S. Application Data

(63) Continuation of application No. 10/358,326, filed on Feb. 5, 2003, now abandoned.

(30) Foreign Application Priority Data

Oct. 21, 2002 (DE) ................. 102 49 092

(51) Int. Cl.
*H02P 3/00* (2006.01)
(52) U.S. Cl. ............... 318/55; 318/49; 318/50; 318/34
(58) Field of Classification Search .............. None
See application file for complete search history.

(56) References Cited

U.S. PATENT DOCUMENTS

| | | | |
|---|---|---|---|
| 3,657,525 A | 4/1972 | Evans | |
| 4,204,255 A | 5/1980 | Cremer | |
| 4,264,849 A | 4/1981 | Fleicher et al. | |
| 4,289,997 A | * 9/1981 | Jung et al. | 318/113 |
| 4,456,861 A | * 6/1984 | Ratzel et al. | 318/568.1 |
| 4,661,752 A | 4/1987 | Nishikawa et al. | |
| 4,845,620 A | 7/1989 | Parker | |
| 5,497,326 A | 3/1996 | Berland et al. | |
| 5,726,541 A | 3/1998 | Glenn et al. | |
| 6,243,635 B1 | 6/2001 | Swan et al. | |
| 6,339,302 B1 | 1/2002 | Greenbank et al. | |
| 6,538,405 B1 | 3/2003 | Brzozowski et al. | |
| 6,590,354 B2 | 7/2003 | Hein | |
| 6,653,810 B2 | 11/2003 | Lo | |
| 6,722,148 B2 | 4/2004 | Aoki et al. | |
| 6,731,088 B2 | 5/2004 | Nivet | |
| 6,943,521 B2 | 9/2005 | Kurokawa et al. | |

FOREIGN PATENT DOCUMENTS

| | | |
|---|---|---|
| DE | 3909905 A1 | 9/1990 |
| DE | 19514954 C2 | 12/1995 |
| DE | 19710082 A1 | 10/1998 |
| DE | 19832531 A1 | 2/2000 |
| DE | 19933688 A1 | 12/2000 |

(Continued)

*Primary Examiner*—Walter Benson
*Assistant Examiner*—Renata McCloud
(74) *Attorney, Agent, or Firm*—Shlesinger, Arkwright & Garvey LLP

(57) ABSTRACT

The invention relates to a vehicle seat, in particular for a motor vehicle, and equipped with a central control unit, motors, peripheral motor control devices each associated to one motor and connected to the central control unit. To allow rapid and accurate adjustments while providing versatility, the invention provides that each motor and its associated motor control device shall constitute a closed regulation loop.

14 Claims, 2 Drawing Sheets

FOREIGN PATENT DOCUMENTS

Figure 1:
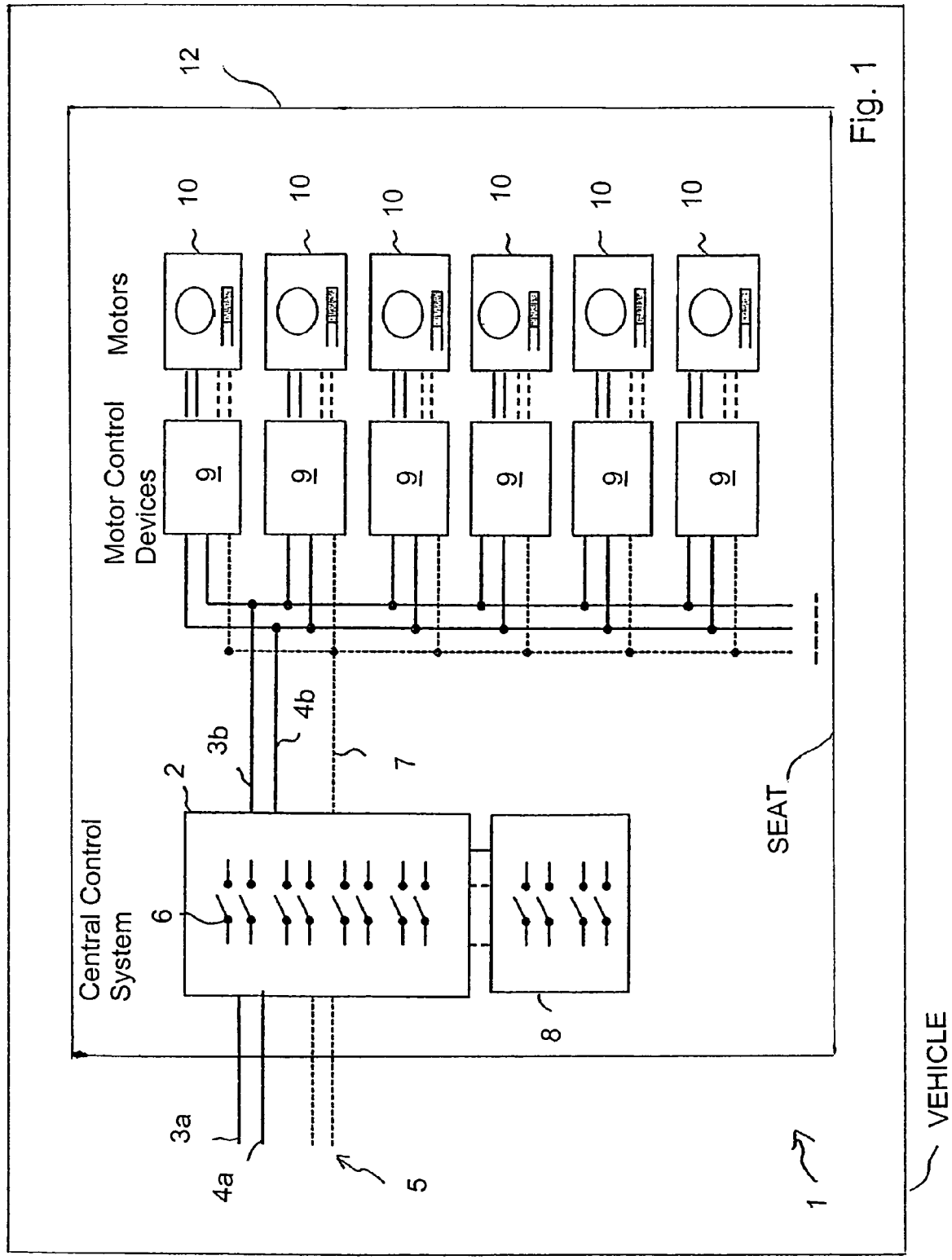

| | | |
|---|---|---|
| DE | 10008455 A1 | 8/2001 |
| DE | 10053598 A1 | 5/2002 |
| DE | 10160010 A1 | 9/2002 |
| DE | 10109563 A1 | 10/2002 |
| EP | 0230203 | 7/1987 |
| EP | 0834418 | 4/1998 |
| WO | WO 0231959 A1 | 4/2002 |

* cited by examiner

VEHICLE SEAT, IN PARTICULAR A MOTOR-VEHICLE SEAT

RELATED APPLICATION

This is a continuation of application Ser. No. 10/358,326, filed Feb. 5, 2003 now abandoned, which claims priority from Germany application no. 102 49 092.6, filed Oct. 21, 2002, hereby incorporated by reference.

FIELD OF THE INVENTION

The present invention relates to a motor-vehicle seat. Such motor-vehicle seats offer high comfort, their motors besides adjusting the position and the slope of the seat components also allowing adjusting further comfort-related functions such as air circulation, shaping the padding and pneumatically damping the padding elements.

BACKGROUND OF THE INVENTION

The motors used in vehicle seats conventionally are driven from the central control system by means of a connection which in general is in radial form. This configuration entails substantial lengths of cable. If the set of vehicle functions is changed, the central program system must be re-programmed or possibly it must be exchanged against a new model.

The European patent document EP 0 230 203 A2 discloses a vehicle seat of the initially cited kind wherein each motor is combined with a peripheral motor control device that in turn is connected to a central motor control system. This central motor control system issues commands to adjust all seat-adjusting motors and is also the space wherein the memory functions retrieving the final adjustment values take place. The European patent document EP 0834418A shows a vehicle seat for which adjustment commands are multiplexed to the peripheral motor control devices. Moreover said central motor control system manages control commands reversing the direction of rotation and memory functions.

However such designs incur the drawback, in particular, of being inflexible with respect to subsequent alterations. Moreover large quantities of data must be stored and transferred on account of the data detected by the sensors present in the seat and of the motor adjustments caused by the central control system, and as a result the dynamic response function may be restricted.

OBJECTS AND SUMMARY OF THE INVENTION

The objective of the present invention is to offer improvements over the state of the art and in particular to create a flexibly adjustable system allowing rapid and accurate adjustment. Advantageously, the present invention shall be implemented in comparative simplicity and at low cost.

This problem is solved by the vehicle seat defined in the present invention.

In the present invention, therefore, peripheral, closed loops are created each time using one motor and one peripheral motor control device. One or more functions may be carried out without data transmission to the central control unit. The closed regulation loops therefore are able to operate rapidly and reliably, in particular also in parallel and independently of one another. In particular the motors may be adjusting motors.

The functions implemented by the peripheral regulation loops in particular may relate to adjust running to the right or left, detecting an angular speed, for instance using PWM (pulse width modulation), position detection by digital or analog sensors and/or position regulation. Also using obstacle detectors, a corresponding adjusting motor may be regulated in a manner that said seat shall not be moved against or beyond said obstacle.

In especially preferred manner, a memory function is present in the closed regulation loop. In particular a slow-start and a learning function for the limit positions, e.g. stops, for instance also with timed reset or timed setup may be implemented in the process.

The invention also allows including self-testing and misuse protection in one or more closed regulation loops.

Moreover the functions of easy entry and/or easy exit relating to the vehicle seat may be implemented in the closed regulation loop mode. As regards easy entry, the seat may be rapidly made accessible for entry, or be moved back. As regards easy exit, release or adjustment allows easy exit, for instance when the ignition key is withdrawn. For that purpose and as called for, the control signals from the central control unit are applied if desired solely at the beginning of easy entry or easy exit operation to the pertinent peripheral motor control devices of the corresponding regulating loops.

The central control unit may receive signals in particular through lines internal to the vehicle, for instance a CAN (controller area network) bus, and through user-actuated switches. The connection between the central control unit and the peripheral motor control devices advantageously may be implemented using a bus, for instance a serial LIN (local interconnect network) bus. Accordingly the central control unit also acts as an interface between data transmission system inside the vehicle, for instance the CAN bus, and a data bus inside the seat. By using a bus system in the vehicle seat, substantially cost savings can be made, especially as compared with conventional radial, star-form circuits of the central control unit feeding the motor control devices. Moreover the central control unit makes it possible to interrupt the power to all the regulation loops.

The motor control devices in particular may be identical in design, thereby enabling substantial reductions in costs. Illustratively a programmable read-only-memory, for instance EPROM or EEPROM, may be programmed or flashed following manufacture of the particular peripheral motor control device. In this manner the costs of the peripheral, closed regulation loops of the invention—in spite of the additionally required functions which must be implemented by the peripheral motor control devices—may be kept low.

Alternatively the peripheral motor control devices also may be integrated into the motors.

BRIEF DESCRIPTIONS OF THE DRAWINGS

The invention is elucidated below in relation to several embodiments shown in the attached drawings.

Figure 2:
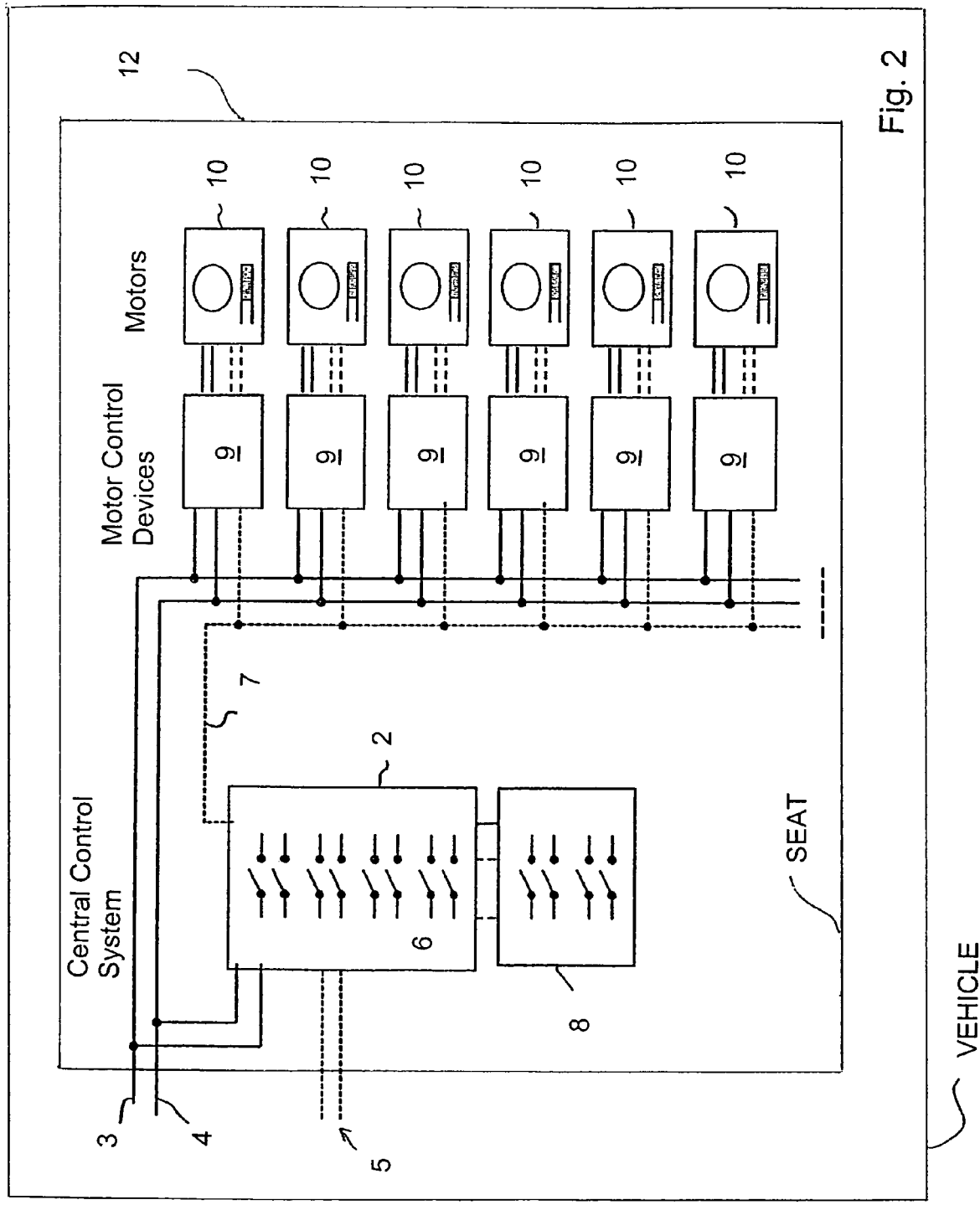

FIG. 1 is a circuit diagram of a control system of a vehicle seat of the invention, and FIG. 2 is an alternative embodiment to that of FIG. 1.

DETAILED DESCRIPTION OF THE INVENTION

An adjusting system 1 comprises a central control unit 2 which, in the embodiment mode of FIG. 1, is connected to feed lines 3a, 4a and to a CAN bus 5. Feed lines 3b, 4b internal to the seat run from the central control unit 2 into a vehicle seat 12. Furthermore the central control unit 2 is connected to a serial LIN bus. A switch 6, for instance an 8-pole switch, to be used by the operator for the various vehicle-seat adjustment functions, is integrated in the shown embodiments into the central control unit 2. By means of an extension adapter 8, further switches 6 may be used. The central control unit and the peripheral motor control devices are designed as a master-slave control system.

Several closed regulation loops mounted in parallel each comprise one peripheral motor control device 9 and one motor 10 driven by the motor control device 9. Illustratively the motors 10 may be adjusting motors to adjust a position and/or an attitude of a seat element or a padding zone; moreover said motors 10 may illustratively adjust a pneumatic damper, or drive a blower etc. In this instance too the motor control device 9 may receive signals, especially signals denoting position or obstacles, that are emitted by omitted detectors, and use them to regulate the motor 10. In this process regulation of position will be feasible, in other words, an inadmissible position may be averted.

At least one of the closed regulation loops assumes one or more of the following functions: angular-speed detection, angular-speed regulation, detection of direction of rotation, adjusting direction of rotation, detection of position, regulating position, obstacle detection, obstacle-detected limitation of excursion based on obstacle detection or on stops, protection against misuse, self-testing, easy-entry function to allow quick seat access or adjustment, easy-exit function to quickly release seat or adjust it, heat regulation, air circulation regulation, adjustment of seat pneumatics, adjustment of seat hydraulics.

At least one closed regulation loop comprises at least one memory function including the storage of setpoint values in a memory of the peripheral motor control devices. The minimum of one closed regulation loop is fitted with at least one memory function, one learning function for the initial determination of the setpoint values, including regular resetting of setpoint values.

The motor control devices 9 are connected to the feed lines 3b, 4b and to the LIN bus 7. In particular they may include storage for memory functions. The bus 7 may be expanded in relation to the bus' internal addresses. As regards the embodiment of FIG. 1, the central control unit 2 is able to make or break connection between the power lines 3a, 4a and 3b, 4b. In this process a sleep mode of the closed regulation loop 9, 10 may be set in the central control unit 2. Protection by polarization is integrated into the central control unit 2. The power lines 3b and 4b issuing from the central control unit to the peripheral motor control devices are connected in polarization-securing manner to the central control unit 2.

As regards the embodiment mode shown in FIG. 2, the power to the peripheral, closed regulation loops 9, 10 is provided by the power lines 3, 4 which are not cut by the central control unit 2. In this embodiment the central control unit 2 is connected in parallel to the motor control devices 9 to the power lines 3, 4. A sleep mode of the motors 10 may be set by means of corresponding control commands from the central control unit 2 to the motor control devices 9.

We claim:

1. A vehicle seat comprising:
a central control unit,
peripheral motor control devices operably connected to the central control unit,
motors, each associated to one peripheral control device, each motor and an associated peripheral control device constituting a closed regulation loop to carry out one or more functions without data transmission to the central control unit,
the motor control devices are connected to one another and to the central control unit by a serial bus,
the central control unit and the peripheral motor control devices are configured as a master-slave control system, and
the motor control devices are connected to power lines that issue from the central control unit.

2. Vehicle seat as claimed in claim 1, wherein the bus system is expandable to receive further motor control devices.

3. Vehicle seat as claimed in claim 1, wherein the motor control devices are connected to joint power lines.

4. Vehicle seat as claimed in claim 1, wherein the power lines issuing from the central control unit to the peripheral motor control devices are polarized-connected to the central control unit.

5. Vehicle seat as claimed in claim 3, wherein the central control unit and the peripheral motor control devices are connected in parallel to the power lines.

6. Vehicle seat as claimed in claim 1, wherein at least one of the closed regulation loops assumes one or more of the following functions: angular-speed detection, angular-speed regulation, detection of direction of rotation, adjusting direction of rotation, detection of position, regulating position, obstacle detection, obstacle-detected limitation of excursion based on obstacle detection or on stops, protection against misuse, self-testing, easy-entry function to allow quick seat access or adjustment, easy-exit function to quickly release seat or adjust it, heat regulation, air circulation regulation, adjustment of seat pneumatics, adjustment of seat hydraulics.

7. Vehicle seat as claimed in claim 6, wherein the angular-speed regulation is carried out by means of PWM.

8. Vehicle seat as claimed in claim 6, wherein the angular-speed regulation is carried out as a function of obstacle detection.

9. Vehicle seat as claimed in claim 1, wherein at least one closed regulation loop comprises at least one memory function including the storage of setpoint values in a memory of the peripheral motor control devices.

10. Vehicle seat as claimed in claim 9, wherein the minimum of one closed regulation loop is fitted with at least one memory function, one learning function for the initial determination of the setpoint values, including regular resetting of setpoint values.

11. Vehicle seat as claimed in claim 1, wherein a sleep mode of the peripheral motor control devices is adjustable in the central control unit.

12. Vehicle seat as claimed in claim 1, wherein the peripheral motor control devices are integrated into the motors.

13. Vehicle seat as claimed in claim 1, wherein the peripheral motor control devices are identical in design but programmed differently.

14. Vehicle seat as claimed in claim 1, wherein user operated switches are present at or in the central control unit for the purpose of seat adjustment and in that, after actuation of the switches, control signals shall be issued by said central control unit to the peripheral motor control devices.

* * * * *